United States Patent [19]

Peterson

[11] Patent Number: 4,907,930
[45] Date of Patent: Mar. 13, 1990

[54] ANTI CROSS THREAD NUT

[75] Inventor: Francis C. Peterson, Woodbury, Conn.

[73] Assignee: Buell Industries, Inc., Waterbury, Conn.

[21] Appl. No.: 230,589

[22] Filed: Aug. 10, 1988

[51] Int. Cl.⁴ .............................................. F16B 37/16
[52] U.S. Cl. .................... 411/437; 411/427; 411/924
[58] Field of Search ............... 411/337, 378, 386, 387, 411/411, 417, 427, 436, 437, 924; 10/155 R, DIG. 11; 285/178, 390, 391, 333, 334

[56] References Cited

U.S. PATENT DOCUMENTS

| 192,718 | 7/1877 | Smith | 285/390 X |
|---|---|---|---|
| 341,146 | 5/1886 | Howes | 411/386 X |
| 561,913 | 6/1896 | Paquette | 411/437 |
| 1,008,551 | 11/1911 | Lorenz | 411/417 X |
| 2,564,029 | 8/1951 | Peterson | 411/386 X |
| 3,757,591 | 9/1973 | Taylor | 411/437 X |

FOREIGN PATENT DOCUMENTS

| 188372 | 8/1937 | Switzerland | 411/411 |
|---|---|---|---|
| 4261 | of 1891 | United Kingdom | 411/378 |
| 750775 | 6/1956 | United Kingdom | 411/427 |
| 2116279 | 9/1983 | United Kingdom | 411/386 |

Primary Examiner—Rodney M. Lindsey
Assistant Examiner—F. Saether
Attorney, Agent, or Firm—St. Onge Steward Johnston & Reens

[57] ABSTRACT

A female threaded fastener, such as a nut, for preventing cross threading with a male threaded fastener comprises a body in which there is a threaded bore. A mouth is formed on at least one open end of the bore. The mouth has a partial thread section and a lip segment. The partial thread section has formed in it at least one partial thread. The lip section is unthreaded and may be angled radially outwardly from the bore.

15 Claims, 1 Drawing Sheet

ANTI CROSS THREAD NUT

FIELD OF THE INVENTION

The present invention relates to female threaded fasteners such as nuts and other internally threaded fasteners which prevent cross threading when threaded together with a matchng male threaded fastener such as a screw or bolt.

DESCRIPTION OF THE PRIOR ART

Screw threaded male fasteners such as machine screws, bolts and studs are typically used with matching female screw threaded fasteners such as nuts or bores having rheading tapped into them. When such fasteners are fitted together, care must be taken to insure that the male and female fasteners are properly aligned, otherwise cross threading can occur when they are torqued together. Cross-threading can damage the threads on both the male and female fasteners, and can cause the fastener parts to seize together. When such a fastener combination is seized, it will not tighten further, creating an insecure attachment and a variety of potential hazards such as the possibility of personal injury or damage to equipment. In addition, a seized fastener combination is difficult to disconnect, and the threads on the male and female fasteners will be damaged when the parts are disconnected.

SUMMARY OF THE INVENTION

One object of the present invention is to provide a female threaded fastener which prevents cross threading and its associated problems. More particularly, the present invention provides a female threaded fastener which when mated with a male threaded fastener, will cause the threads on each to be in phase with each other so that the fasteners will screw together without cross threading.

This object, and other objects which will become apparent from the description which follows, are achieved by a female threaded fastener having a body portion which contains a threaded bore having at least one open end. A mouth is located on at least one open end of the bore. The mouth is preferably non-circular and comprises a partial thread section and an unthreaded lip section. The partial thread section is contiguous with the threaded bore and has formed in it at least one partial thread that is of the same thread pitch as in the bore. Preferably there are two partial threads formed in the partial thread section of the bore mouth, the first partial thread being located adjacent the opening of the bore mouth and having a circumferential length equal to about 15 to about 65 percent of the diameter of the bore, and the second partial thread being adjacent the first partial thread and having a circumferential length equal to about 20 to about 70 percent of the diameter of said bore. The lip section is preferably angled radially outwardly from the bore, preferably at an angle of between about 2 to about 10 degrees from the central axis of the bore, and most preferably at about 5 degrees from the central axis of the bore.

DETAILED DESCRIPTION OF THE INVENTION

Figure 3:
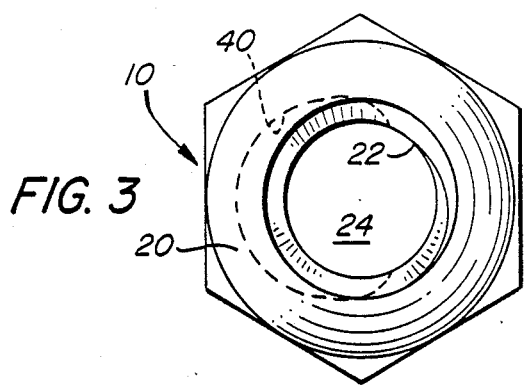
FIG. 3 is a top elevation view of the fastener of FIG. 1.

For ease of description, the following detailed discussion is made with reference to a nut as shown in FIGS. 1-4. As will be apparent, however, the invention is broadly applicable to any female threaded fastener having a threaded bore open on at least one end thereof.

A female threaded fastener, such as the nut 10 shown in FIGS. 1, 2, 3 and 4, comprises a body 20 with a bore 22 therein. The bore 22 may completely penetrate the body 20, as is shown for the nut in the Figures, or it may extend through only a portion of body 20. The bore has at least one open end 24 for receiving a threaded male fastener such as a screw, bolt or stud. In at least one of the open ends 24 there is a mouth 26 comprised of a partial thread section 30 and a lip section 40. Preferably mouth 26 is non-circular, as for example, the generally oval shape shown in FIGS. 1 and 2. However, a circular mouth shape and a variety of non-circular mouth shapes also may be used in conjunction with the present invention.

The partial thread section 30 of mouth 26 is contiguous with the bore 22 and has formed within it at least one partial thread having the same thread pitch as in the bore. The at least one partial thread comprises between about 20 to about 70 percent of the diameter of the bore 22, and preferably comprises about 25 to about 50 percent of the diameter of bore 22. Partial thread section 30 preferably has two partial threads located within it. The first partial thread 32 is adjacent the open end of the bore 22 and has a circumferential length equal to about 15 to about 65 percent of the diameter of bore 22. The second partial thread 34 is adjacent the first partial thread and has a circumferential length equal to about 20 to about 70 percent of the diameter of bore 22. Most preferably, the first partial thread 32 has a circumferential length equal to about 25 to about 40 percent of the diameter of bore 22, and the second partial thread 34 has a circumferential length equal to about 30 to about 50 percent of the diameter of bore 22.

Figure 1:
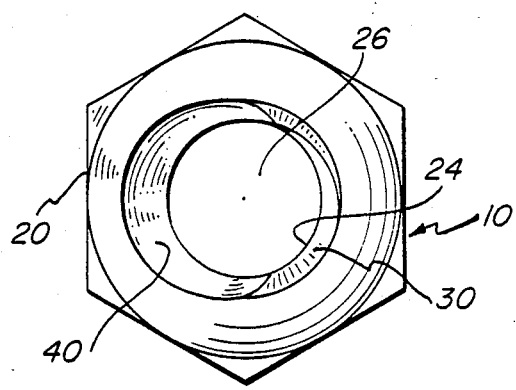
FIG. 1 is a bottom elevation view of an embodiment of a female threaded fastener of the present invention.

Lip section 40 is formed in mouth 26 opposite the partial thread section 30. Lip section 40 is unthreaded. As shown in FIG. 1, lip section 40 preferably has a curved shape; however, other shapes may be used within the scope of the invention provided there are no threads formed thereon.

Figure 2:
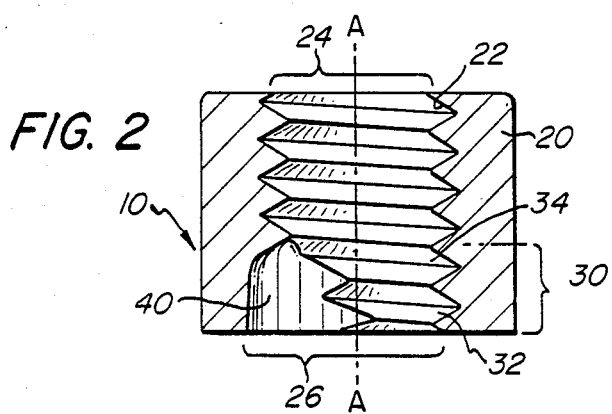
FIG. 2 is a cross sectional view of the fastener of FIG. 1.
Figure 4:
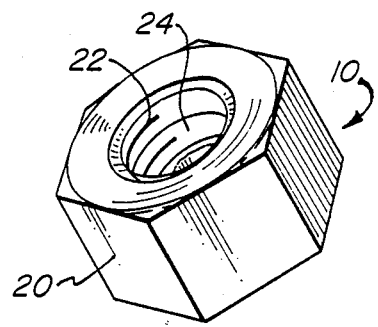
FIG. 4 is a perspective view of the fastener of FIG. 1.

Preferably the lip section 40 is angled radially outwardly from the central axis of bore 22, as shown in FIG. 2. The angle is between about 2 to about 10 degrees from the central axis A—A of bore 22 shown in FIG. 2. Most preferably, the angle is about 5 degrees from the axis A—A of bore 22.

The female threaded fastener of the present invention may be made in a variety of ways. Typically a body such as a nut will be formed by casting or extrusion processes as are known in the art. The mold or die used to form the body may be shaped such that the lip section is formed at the time the body is formed. Alternatively, the lip section may be formed in the mouth of the bore after the body is made by drilling into the body at a point offset from the central axis of the bore, or by a punch or other impact tool applied at such point.

Threads may then be applied to the bore by a tapping operation. Where the lip section extends radially outwardly from the bore, no threads will be formed on the lip section. Alternatively, lip section may be formed by drilling or punching after the threads have been applied to the bore.

The female threaded fastener of the present invention prevents cross threading by providing the unthreaded lip section 40, which guides a male threaded fastener as it is inserted into the female threaded fastener and causes the threads of the male threaded fastener to be positioned adjacent the at least one partial thread with the threads of the male fastener in phase with the threads of the female fastener. The male and female threaded fasteners may then be torqued together. The present invention thus provides advantages over the prior art, as it eliminates the step of carefully fitting and aligning the threads of male and female fastenres before torquing them together with power tools, and also because it minimizes problems of cross threading which can occur even when care is exercised in the fitting together of conventional fasteners.

I claim:

1. An anti cross threading female threaded fastener, comprising:
   a body having a threaded bore therein, said bore having a central axis and at least one open end for receiving a threaded male fastener; and
   an unthreaded lip section formed in said at least one open end, said lip section being offset from the central axis of said bore;
   at least one partial thread formed in said bore opposite said lip section;
   said at least one partial thread comprising between about 20 to about 70 percent of the diameter of said bore;
   wherein said lip section and said at least one partial thread coact to guide a threaded male fastener such that threads on said male fastener are in phase with said thread in said bore,
   the thread in said bore extending from said lip section through to the other end of said body, whereby cross threading of said male fastener and female fastener is minimized.

2. An anti cross threading female threaded fastener in accordance with claim 1, wherein said at least one partial thread comprises about 25 to about 50 percent of the diameter of said bore.

3. An anti cross threading female threaded fastener in accordance with claim 1, wherein the walls of said lip section are angled radially outwardly from the central axis of said bore.

4. An anti cross threading female threaded fastener comprising:
   a body;
   a threaded bore contained in said body, said bore having a central axis and at least one open end for receiving a threaded male fastener;
   a mouth formed on said at least one open end of said bore, said mouth comprising
   a single unthreaded lip section, said lip section being offset from the central axis of said bore, and
   a single partial thread section located opposite said unthreaded lip section, and occupying the remainder of said base, in which is formed at least one partial thread;
   wherein said lip section and said at least one partial thread coact to guide a threaded male fastener such that threads on said male fastener are in phase with said thread in said bore, the thread in said bore extending from said lip section through to the other end of said body, whereby cross threading of said male fastener and female fastener is minimized.

5. An anti cross threading female threaded fastener in accordance with claim 4, wherein the walls of said lip section are angled radially outwardly from said bore.

6. An anti cross threading female threaded fastener in accordance with claim 5, wherein said lip section walls are angled at an angle of between about 2 to about 10 degrees from the central axis of said bore.

7. An anti cross threading female threaded fastener in accordance with claim 6, wherein said lip section walls are angled at an angle of about 5 degrees from the central axis of said bore.

8. An anti cross threading female threaded fastener in accordance with claim 4, wherein said body comprises a nut.

9. An anti cross threading female threaded fastener in accordance with claim 4, wherein there are two said partial threads, the first said partial thread being located adjacent the open end of said bore and having a circumferential length equal to about 15 to about 65 percent of the diameter of said bore, and the second said partial thread being adjacent the first partial thread and having a circumferential length equal to about 20 to about 70 percent of the diameter of said bore.

10. An anti cross threading female threaded fastener in accordance with claim 9, wherein said first partial thread has a circumferential length equal to about 25 to about 40 percent of the diameter of said bore, and the second said partial thread has a circumferential length equal to about 30 to about 50 percent of the diameter of said bore.

11. An anti cross threading nut comprising:
    a body;
    a threaded bore having a central axis contained in said body;
    a mouth for receiving a male threaded fastener located in at least one end of said bore, said mouth comprising
    a lip section, said lip section being offset from the central axis of said bore, and
    a partial thread section in which is formed two partial threads, the first said partial thread being located adjacent the open end of said bore and having a circumferential length equal to about 15 to about 65 percent of the diameter of said bore, and the second said partial thread being adjacent the first partial thread and having a circumferential length equal to about 20 to about 70 percent of the diameter of said bore, wherein said lip section and said two partial threads coact to guide a threaded male fastener such that threads on said male fastener are in phase with said thread in said bore, the thread in said bore extending from said lip section through to the other end of said bore, whereby cross threading of said male fastener and female fastener is minimized.

12. An anti cross threading nut in accordance with claim 11, wherein the walls of said lip section are angled radially outwrdly from said bore.

13. An anti cross threading nut in accordance with claim 12, wherein said lip section walls are angled at an angle of between about 2 to about 10 degrees from the axis of said bore.

14. An anti cross threading nut in accordance with claim 13, wherein said lip section walls are angled at an angle of about 5 degrees from the axis of said bore.

15. An anti cross threading nut in accordance with claim 11, wherein said first partial thread has a circumferential length equal to about 25 to about 40 percent of the diameter of said bore, and the second said partial thread has a circumferential length equal to about 30 to about 50 percent of the diameter of said bore.

* * * * *